United States Patent
Kawakami et al.

(10) Patent No.: US 9,060,541 B2
(45) Date of Patent: Jun. 23, 2015

(54) STERILIZER FOR FOODS

(75) Inventors: Hiroo Kawakami, Hyogo (JP);
Mitsuaki Nishibuchi, Kyoto (JP);
Noriko Kotani, Osaka (JP); Yasuharu Yamashita, Osaka (JP)

(73) Assignees: Kawakami Co., Ltd., Osaka (JP); Kyoto University, Kyoto (JP)

( * ) Notice: Subject to any disclaimer, the term of this patent is extended or adjusted under 35 U.S.C. 154(b) by 22 days.

(21) Appl. No.: 13/318,467

(22) PCT Filed: Jun. 24, 2010

(86) PCT No.: PCT/JP2010/060766
§ 371 (c)(1),
(2), (4) Date: Feb. 24, 2012

(87) PCT Pub. No.: WO2010/150850
PCT Pub. Date: Dec. 29, 2010

(65) Prior Publication Data
US 2012/0141646 A1     Jun. 7, 2012

(30) Foreign Application Priority Data
Jun. 26, 2009   (JP) .................................. 2009-152437

(51) Int. Cl.
| | |
|---|---|
| A23D 9/013 | (2006.01) |
| A23L 3/3508 | (2006.01) |
| A23L 3/349 | (2006.01) |
| A23L 3/358 | (2006.01) |
| A01N 25/00 | (2006.01) |
| A01N 59/06 | (2006.01) |

(52) U.S. Cl.
CPC ............... *A23L 3/3508* (2013.01); *A23L 3/349* (2013.01); *A23L 3/358* (2013.01); *A23V 2002/00* (2013.01)

(58) Field of Classification Search
CPC ....... A23L 3/349; A23L 3/3508; A23L 3/358; A23V 2002/00; A23V 2200/10; A23V 2250/042; A23V 2250/1578
USPC .................................. 426/531; 424/405, 682
See application file for complete search history.

(56) References Cited

U.S. PATENT DOCUMENTS 5,409,714 A * 4/1995 Ishijima ...................... 424/693

FOREIGN PATENT DOCUMENTS

| CN | 1073580 A | 6/1993 |
|---|---|---|
| CN | 1568717 A | 1/2005 |
| JP | 63-133972 | 6/1988 |
| JP | 63133972 A * | 6/1988 |
| JP | 8-289768 | 11/1996 |

(Continued)

OTHER PUBLICATIONS

Jordan et al. Augmentation of Killing of *Escherichia coli* O157 by Combinations of Lactate, Ethanol, and Low-pH Conditions Applied and Environmental Biology, Mar. 1999, p. 1308-1311.*

(Continued)

*Primary Examiner* — Michele L Jacobson
*Assistant Examiner* — Subbalakshmi Prakash
(74) *Attorney, Agent, or Firm* — Vedder Price P.C.

(57) ABSTRACT

Disclosed is a sterilizer for foods, which contains calcinated calcium or calcium hydroxide and has a higher sterilizing activity than conventional sterilizers. The sterilizer is made up of an aqueous solution or an aqueous dispersion prepared by blending calcinated calcium or calcium hydroxide, ethanol, and sodium lactate.

10 Claims, 1 Drawing Sheet

(56) References Cited

FOREIGN PATENT DOCUMENTS

| JP | 08289768 A | * | 11/1996 |
|---|---|---|---|
| JP | 09248166 A | * | 9/1997 |
| JP | 10-291947 | | 11/1998 |
| JP | 11-222796 | | 8/1999 |
| JP | 11-290044 | | 10/1999 |
| JP | 2002-272434 | | 9/2002 |
| JP | 2002272434 A | * | 9/2002 |

OTHER PUBLICATIONS

Bae et al. Bactericidal Effects of CaO (Scallop-Shell Powder) on Foodborne Pathogenic Bacteria Arch Pharm Res vol. 29, No. 4, 298-301, 2006.*

Sawai et al.Kinetic analysis of the bactericidal action of heated scallop-shell powder International Journal of Food Microbiology 71 Ž2001. 211-218.*

Munoz-Ruiz et al.Bactericidal effect of hydrated lime in aqueous solution Bol Oficina Sanit Panam. Apr. 1995;118(4):302-6 (Abstract).*

International Search Report (with English translation) for PCT/JP2010/060766.

Written Opinion of the International Searching Authority (with English translation) for PCT/JP2010/060766.

International Preliminary Report on Patentability (with English translation) for PCT/JP2010/060766.

Examination Report Issued in corresponding Chinese Patent Application No. 201080027583.7 and its English translation.

Examination Report Issued in corresponding Australian Patent Application No. 2010263554.

European Search Report dated Nov. 28, 2012 issued in connection with EP Application No. 10792168.8. 10 pages.

"Morphological control and in vitro bioactivity of nanoscale bioactive glasses," Journal of Non-Crystalline Solids 355 (2009) 791-796.

Second Official Action issued by the Chinese Patent Office in connection with corresponding Chinese Patent Application No. 201080027583.7, 3 pages, dated Aug. 14, 2013. (with English translation).

Communication pursuant to Article 94(3) EPC dated Jun. 18, 2013 issued in connection with corresponding European App. No. 10792168.6. 5 pages.

* cited by examiner

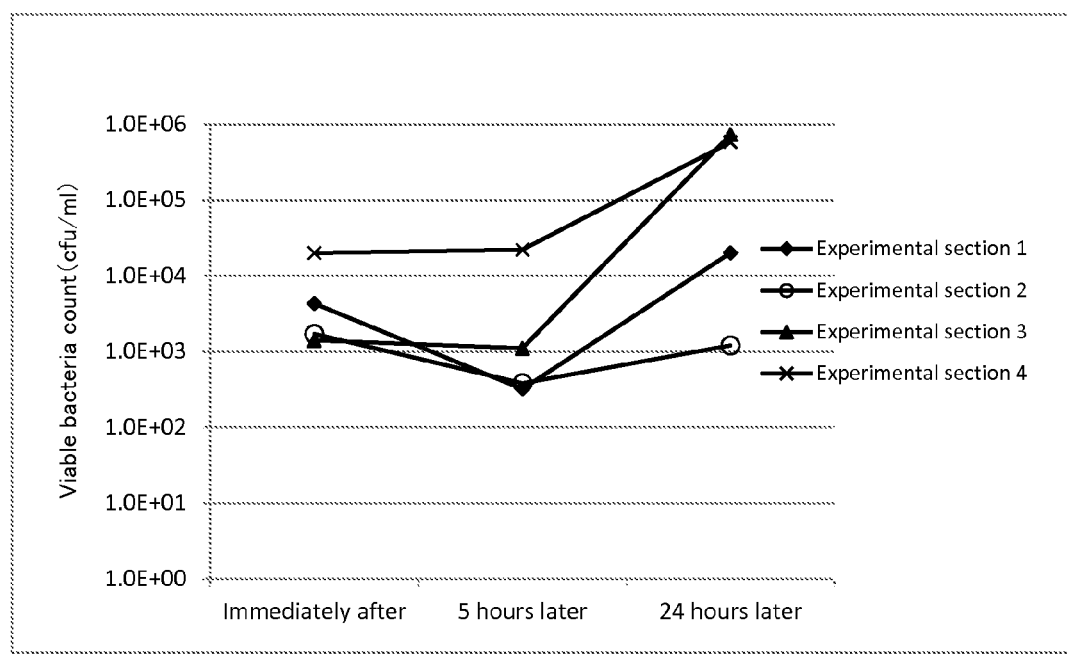

STERILIZER FOR FOODS

BACKGROUND OF THE INVENTION

1. Field of the Invention

The present invention relates to a sterilizer that is used for sterilizing foods, food manufacturing equipments, etc., and is prepared by blending calcined calcium or calcium hydroxide.

2. Description of the Related Art

Although conventionally, sodium hypochlorite is mainly used for sterilization of foods and cooking utensils, it has problems of odor during work, remaining of odor in foods, carcinogenicity of decomposition products (generation of trihalomethanes), decrease of effect under presence of organic matter, etc., and development of a new sterilization method has been sought.

Recently, it has been disclosed that calcinated shell calcium and calcium hydroxide, which is a hydrate of the calcinated calcium, have antimicrobial properties (Patent Document 1), and a microbe suppressing agent for foods in which an organic acid salt is blended with the calcinated shell calcium (Patent Document 2), a microbe eradicating agent for foods in which a polyvalent alcohol fatty acid ester and ethanol are blended with the calcinated calcium (Patent Document 3), etc., have been disclosed.

Patent Document 1: Japanese Published Unexamined Patent Application No. Hei 11-222796
Patent Document 2: Japanese Published Unexamined Patent Application No. Hei 11-290044
Patent Document 3: Japanese Published Unexamined Patent Application No. 2002-272434

However, adequate sterilization effects have not been obtained with the abovementioned microbe suppressing agent and microbe eradicating agent (hereinafter, referred to collectively as "sterilizers").

SUMMARY OF THE INVENTION

The present invention has been made in view of the above circumstances and a main object thereof is to provide a sterilizer for foods, which contains calcinated calcium or calcium hydroxide and has a higher sterilizing activity than conventional sterilizers.

As a result of continuing diligent research toward achieving the above object, the present inventors found that a high sterilization effect is obtained by using calcinated calcium or calcium hydroxide in combination with ethanol and sodium lactate, and have thereby come to complete the present invention.

That is, the gist of the present invention is as follows.

[1] A sterilizer for foods that is an aqueous solution or an aqueous dispersion prepared by blending calcinated calcium, ethanol, and sodium lactate.
[2] The sterilizer for foods according to [1] where the calcinated calcium is one type of substance or a mixture of two or more types of substances selected from among calcinated products of oyster shells, scallop shells, surf clam shells, eggshells, and coral shells.
[3] The sterilizer for foods according to [1] prepared by blending calcium hydroxide in place of calcinated calcium.
[4] The sterilizer for foods according to any of [1] to [3] where a blend proportion of the calcinated calcium or calcium hydroxide is 0.01 to 15 weight %, a blend proportion of ethanol is 5 to 20 weight %, and a blend proportion of sodium lactate is 0.02 to 20 weight %.
[5] The sterilizer for foods according to any of [1] to [4] where an average particle diameter of both the calcinated calcium and calcium hydroxide is 0.1 to 10 µm.
[6] A food of improved preservation property obtained by being sterilized by the sterilizer for foods according to any of [1] to [5].

The sterilizer according to the present invention is made up of the aqueous solution or the aqueous dispersion prepared by blending calcinated calcium or calcium hydroxide, ethanol, and sodium lactate, and can thus provide a high sterilizing activity against *Escherichia coli*, *Staphylococcus aureus*, and other food poisoning microbes.

BRIEF DESCRIPTION OF THE DRAWINGS

FIG. 1 is a diagram of results of a sterilization test in which a product according to the present invention is used on beef (yukhoe; raw beef).

DETAILED DESCRIPTION OF THE PREFERRED EMBODIMENTS

As described above, the sterilizer according to the present invention has calcinated calcium or calcium hydroxide, ethanol, and sodium lactate blended therein as effective components and is used in food applications. Food applications signify applicability not only to foods per se but also to cooking utensils, cooking equipments, and other food manufacturing equipments.

The calcinated calcium used in the present invention is a component that is a principal agent of the sterilizing activity of the sterilizer according to the present invention, is obtained by subjecting oyster shells, scallop shells, surf clam shells, eggshells, coral shells, or other form of animal-derived calcium, with which a component before calcination is calcium carbonate, to calcination or ohmic heating at a temperature of no less than 60° C. and preferably 900 to 1200° C. for approximately 15 to 60 minutes, and has calcium oxide as a main component. Preferably, a saturated aqueous solution of the calcinated calcium obtained has a pH in a range of 11 to 13. An average particle diameter of the calcinated calcium is normally 0.1 to 10 µm. As the calcinated calcium, that which complies with food additive standards is normally used. Although a blending proportion of the calcinated calcium in the sterilizer is not restricted in particular, it is preferably 0.01 to 15 weight % and more preferably 0.1 to 5 weight % from standpoints of sterilizing activity and economy.

The sterilizer according to the present invention is made up of an aqueous solution or an aqueous dispersion containing the above-described calcinated calcium as an essential component, and the calcium oxide that is a principal component of the calcinated calcium reacts with water to form calcium hydroxide. It is generally considered that the calcium hydroxide exhibits a sterilization effect. Thus, with the present invention, calcium hydroxide may be blended in place of the calcinated calcium. An average particle diameter of the calcium hydroxide used in the present invention is normally 0.1 to 10 µm. As the calcium hydroxide, that which complies with food additive standards is normally used. Although a blending proportion of the calcium hydroxide in the sterilizer is not restricted in particular, the blending proportion is preferably 0.01 to 15 weight % and more preferably 0.1 to 5 weight % from standpoints of sterilizing activity and economy. The calcinated calcium is high in hygroscopic property, and thus, the calcinated calcium and calcium hydroxide may be used in combination to improve ease of handling.

As the ethanol used in the present invention, that which complies with food additive standards is normally preferable. A blending proportion of the ethanol is not restricted in particular, and the ethanol is normally blended in a range of 5 to 20 weight %.

The sodium lactate used in the present invention is necessary for improving water solubility of the calcium hydroxide formed by reaction of the calcinated calcium with water, and a 50 weight % or 60 weight % aqueous solution thereof that complies with food additive standards is normally used. Although a blending proportion of the sodium lactate in the sterilizer is not restricted in particular, it is preferably 0.02 to 20 weight %, more preferably 0.1 to 15 weight %, and especially preferably 1 to 15 weight % from standpoints of sterilizing activity and economy.

In addition to the above-described essential components, a fragrance, dye, etc., may be added as necessary to the sterilizer according to the present invention. The sterilizer according to the present invention that is made up of the above components exhibits a high sterilizing activity against *Escherichia coli*, *Staphylococcus aureus*, and other food poisoning microbes. Safety of the sterilizer according to the present invention has also been confirmed through an acute oral toxicity test, eye irritancy test, and primary skin irritation test using animals. The sterilizer according to the present invention is made up of an aqueous solution or an aqueous dispersion and can be used in such forms as liquid, spray, foam, propelled agent, etc.

EXAMPLES

Although the present invention shall now be described in further detail below by way of test examples, etc., the present invention is by no means limited thereby.

1. Sterilization Effects of Compositions Made Up of Calcinated Calcium and Ethanol (Reference Examples)

Compositions were prepared in which calcinated shell calcium (NC Corporation) and ethanol were blended according to the blending formulations shown in Table 1 and Table 2 and water made up the remaining portion, and sterilization effects against *Escherichia coli* (NIHJ) and *Staphylococcus aureus* (209P) (may hereinafter be referred to as "test bacteria") were examined.

(Sterilization Effect Determination Test)

The sterilization effects of the above compositions were determined by Fujimoto's modified method ("Bokin Bobai" (Antibacterial and antifungal agents), Gihodo Shuppan, pp. 683-684) of the Kelsey-Sykes method (The pharmaceutical journal, Nov. 30, 1974 issue, pp. 528-530), which is known as a method for determining the sterilization effects of disinfectants. In outline, the operation procedure is as follows.

(1) 3 ml of the mixed solution or aqueous dispersion prepared as described above was dispensed into a reaction container set at 20° C., 1 ml of the test bacteria adjusted to a concentration of $10^4$ to $10^5$ cfu/ml was added (this point in time is defined as the initial test bacteria addition starting time), and 8 minutes later, the reaction solution was sampled and 0.02 ml (1 drop) thereof were added/inoculated into each of five test tubes containing a post-culture medium (Bacto™ Tryptic Soy Broth).

(2) 2 minutes later (after the elapse of 10 minutes from the addition starting time of step (1)), 1 ml of the test bacteria was injected into the reaction solution, and 8 minutes later (after the elapse of 18 minutes from the addition starting time of step (1)), the reaction solution was sampled and 0.02 ml (1 drop) thereof were added/inoculated into each of five test tubes containing the post-culture medium (Bacto™ Tryptic Soy Broth).

(3) 2 minutes later (after the elapse of 20 minutes from the addition starting time of step (1)), 1 ml of the test bacteria was injected into the reaction solution, and 8 minutes later (after the elapse of 28 minutes from the addition starting time of step (1)), the reaction solution was sampled and 0.02 ml (1 drop) thereof were added/inoculated into each of five test tubes containing the post-culture medium (Bacto™ Tryptic Soy Broth).

(Evaluation)

The five test tubes obtained in each of steps (1) to (3) were subject to culturing for 24 hours at 37° C., and if proliferation of the test bacteria was not seen in three or more of the five test tubes of each step, it was judged that there was a sterilization effect.

The evaluation was specifically carried out as follows. The results are shown in Table 1 and Table 2.

D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).

TABLE 1

<Bacterial strain used: *Escherichia coli*>

| | | Ethanol (wt %) | | | | | | |
|---|---|---|---|---|---|---|---|---|
| | | 0 | 5 | 10 | 20 | 30 | 50 | 75 | 100 |
| Calcinated calcium (wt %) | 0 | D | D | D | D | C | B | B | A |
| | 0.05 | C | C | A | A | A | — | — | — |
| | 0.1 | C | B | A | A | A | — | — | — |
| | 0.2 | B | B | A | A | A | — | — | — |
| | 0.4 | A | A | A | A | A | — | — | — |

D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).
—: Test was not performed (because the effect is obvious).

TABLE 2

<Bacterial strain used: *Staphylococcus aureus*>

| | | Ethanol (wt %) | | | | | | |
|---|---|---|---|---|---|---|---|---|
| | | 0 | 5 | 10 | 20 | 30 | 50 | 75 | 100 |
| Calcinated calcium (wt %) | 0 | D | D | D | D | D | D | B | A |
| | 0.05 | D | D | D | A | A | D | — | — |
| | 0.1 | D | D | C | A | A | — | — | — |
| | 0.2 | D | C | C | A | A | — | — | — |
| | 0.4 | D | B | B | A | A | — | — | — |

D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).
—: Test was not performed (because the effect is obvious).

The results of Table 1 show that against *Escherichia coli*, an adequate sterilization effect (evaluation result: A) was seen when ethanol was blended at no less than 10 weight % in the case where the calcinated calcium was blended at no less than 0.05 weight %. Also, the results of Table 2 show that against *Staphylococcus aureus*, an adequate sterilization effect (evaluation result: A) was seen when ethanol was blended at no less than 20 weight % in the case where the calcinated calcium was blended at no less than 0.05 weight %.

2. Sterilization Effects of Compositions with Sodium Lactate Blended (products according to the present invention)

Various compositions were prepared in which calcinated shell calcium (NC Corporation), ethanol, and sodium lactate (60 weight % aqueous solution, Musashino Chemical Laboratory) were blended according to the blending formulations shown in Table 3 and Table 4 and water made up the remaining portion, and sterilization effects against *Escherichia coli* and *Staphylococcus aureus* were examined. The sterilization effect determination test and evaluation method were carried out in the same manner as in "1. Sterilization effects of compositions made up of calcinated calcium and ethanol (reference example)." The results are shown in Table 3 and Table 4.

TABLE 3

<Sterilization effect against *Escherichia coli*>

| Ethanol (wt %) | | 0 | 5 | 10 |
|---|---|---|---|---|
| Calcinated calcium (wt %) | | 0 | 0.1 | 0.2 |
| Sodium lactate (wt %) | 0 | D | B | A |
| | 1.5 | D | A | — |
| | 3 | D | A | A |
| | 4.5 | D | A | — |
| | 6 | D | — | A |
| | 9 | D | — | A |

D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).
—: Test was not performed (because the effect is obvious).

TABLE 4

<Sterilization effect against *Staphylococcus aureus*>

| Ethanol (wt %) | | 0 | 5 | 10 |
|---|---|---|---|---|
| Calcinated calcium (wt %) | | 0 | 0.1 | 0.2 |
| Sodium lactate (wt %) | 0 | D | D | C |
| | 1.5 | D | D | — |
| | 3 | D | D | C |
| | 4.5 | D | C | — |
| | 6 | D | — | A |
| | 9 | D | — | A |

D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).
—: Test was not performed (because the effect is obvious).

The results of Table 3 show that although with sodium lactate alone, no sterilization effect whatsoever was seen against *Escherichia coli* even when sodium lactate was blended at 9 weight % (see the left column of Table 3), when no less than 1.5 weight % of sodium lactate was blended in the case where 5 weight % of ethanol and 0.1 weight % of calcinated calcium were blended, the sterilization effect evaluation changed from B to A (see central column of Table 3). An effect of enhancing the sterilizing activity against *Escherichia coli* was thus seen when sodium lactate was blended with the composition containing ethanol and calcinated calcium.

This trend was seen significantly in the sterilization effect against *Staphylococcus aureus*. That is, when 4.5 weight % of sodium lactate was blended in the case where 5 weight % of ethanol and 0.1 weight % of calcinated calcium were blended, the sterilization effect evaluation changed from D to C (see central column of Table 4), and when no less than 6 weight % of sodium lactate was blended in the case where 10 weight % of ethanol and 0.2 weight % of calcinated calcium were blended, the sterilization effect evaluation changed from C to A (see right column of Table 4).

It is presumed that the sterilizing activity enhancement effect of sodium lactate is due to improvement of solubility of calcium hydroxide in the composition. That is, it is generally considered that the calcinated calcium reacts with the water in the composition and is present as calcium hydroxide and that the calcium hydroxide exhibits the sterilization effect. The solubility of calcium hydroxide in water is low and although it is thus considered as not exhibiting its inherent sterilization effect, the above results seem to suggest that the solubility of, the formed calcium hydroxide was improved by the addition of sodium lactate.

3. Sterilization Effects of Compositions with Other Organic Acid Salts Blended (Comparative Products)

Besides using the compositions of the blend formulations, which are shown in Table 5 and Table 6 and were prepared by blending each of the three types of organic acid salts shown in the Tables in place of sodium lactate, the sterilization effects against *Escherichia coli* and *Streptococcus aureus* were examined in the same manner as in "1. Sterilization effects of compositions made up of calcinated calcium and ethanol (reference examples)." The results are shown in Table 5 and Table 6.

TABLE 5

<Sterilization effect against *Escherichia coli*>

| Ethanol (wt %) | | 5 |
|---|---|---|
| Calcinated calcium (wt %) | | 0.1 |
| Trisodium | 2.5 | B |
| citrate (wt %) | 5 | B |
| Sodium acetate | 2.5 | C |
| (wt %) | 5 | C |
| Sodium | 2.5 | C |
| tartarate (wt %) | 5 | C |

D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).
—: Test was not performed (because the effect is obvious).

TABLE 6

<Sterilization effect against *Staphylococcus aureus*>

| Ethanol (wt %) | | 10 |
|---|---|---|
| Calcinated calcium (wt %) | | 0.2 |
| Trisodium | 5 | C |
| citrate (wt %) | 10 | C |
| Sodium acetate | 5 | C |
| (wt %) | 10 | C |
| Sodium | 5 | C |
| tartarate (wt %) | 10 | C |

D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).
—: Test was not performed (because the effect is obvious).

The results of Table 5 show that in the case where ethanol was blended at 5 weight % and calcinated calcium was blended at 0.1 weight %, the sterilization effect against *Escherichia coli* of the composition having trisodium citrate blended at 5 weight % was evaluated as B. However, a sterilization effect of the same level was also exhibited by the composition in which ethanol was blended at 5 weight % and calcinated calcium was blended at 0.1 weight % (see top cell of central column of Table 3). Thus, it can be said that an effect of enhancing the sterilizing activity against *Escherichia coli* could not be seen even when trisodium citrate was blended at 5 weight %.

Also, the sterilization effect against *Escherichia coli* of a composition with which sodium acetate or sodium tartarate was blended at 5 weight % was evaluated as C. The sterilization effect was thus reduced instead when sodium acetate or sodium tartarate was blended at 5 weight %.

The above results show that even when any of the three types of organic acid salts used in the present test is blended in a composition containing ethanol and calcinated calcium, the sterilization effect against *Escherichia coli* is not enhanced.

The above results were exhibited more significantly in Table 6 in which the sterilization effects against *Staphylococcus aureus* were examined.

4. Comparison Test 1 of Sterilization Effects Against Various Food Poisoning Microbes An aqueous dispersion, in which calcinated shell calcium (NC Corporation), ethanol, and sodium lactate (60 weight % aqueous solution, Musashino Chemical Laboratory) were blended according to the blend formulation shown below and water made up the remaining portion, was prepared and this dispersion was filtered through a membrane filter (pore diameter: 0.45 μm) to prepare a transparent aqueous solution (product according to the present invention) that was subject to the following sterilization tests. An ethanol solution (30 weight %) and a sodium hypochlorite solution (effective chlorine concentration: 150 ppm) were used as comparison products.

<Blend Formulation>

| | |
|---|---|
| Calcinated calcium | 0.2 weight % |
| Ethanol | 10 weight % |
| Sodium lactate | 6 weight % |
| Water | 83.8 weight % |

The sterilization effects of the product according to the present invention and the comparison products against the 33 types of food poisoning microbes shown in Table 7 were compared. The sterilization effect determination test and evaluation method were carried out in the same manner as in "1. Sterilization effects of compositions made up of calcinated calcium and ethanol (reference examples)." The results are shown in Table 7.

TABLE 7

| Microbe species (scientific name) | Product according to the present invention | EtOH 30% | S.H 150 ppm | Microbe species (scientific name) | Product according to the present invention | EtOH 30% | S.H 150 ppm |
|---|---|---|---|---|---|---|---|
| *Vibrio parahaemolyticus* AQ3815 | A | B | A | *Shigella boydii* serotype 4 KX-H288 | A | D | A |
| *Vibrio cholerae* O1 NIH 41 | A | B | A | *Shigella sonnei* KX-H285 | A | C | A |
| *Vibrio cholerae* O139 MO45 | A | B | A | *Aeromonas sobria* KX-A435 | A | B | A |
| *Vibrio cholerae* non-O1 non-O139 KX-N105 | A | C | A | *Aeromonas hydrophila* KX-A428 | A | B | A |
| *Vibrio mimicus* KX-M5 | A | C | A | Enteropathogenic *Escherichia coli* O55 KX-E59 | A | D | A |
| *Vibrio fluvialis* KX-F24 | A | C | A | Enterotoxigenic *Escherichia coli* RIMD 0509267 | A | D | A |
| *Staphylococcus aureus* 080392-1 Toxin type A | A | B | A | Enterohemorrhagic *Escherichia coli* O157:H7 EDL 933 | A | D | A |
| *Salmonella* serotype Stanley KX-S141 | A | C | A | Enteroinvasive *Escherichia coli* O28ac KX-E63 | A | C | A |
| *Salmonella* serotype Agona KX-S143 | A | C | A | Enteroaggregative *Escherichia coli* O111:H21 K-H-6 | A | D | A |
| *Salmonella* serotype Rissen KX-S151 | A | C | A | *Bacillus cereus* Kyoto 1 | B | C | A |
| *Salmonella* serotype Kentucky KX-S149 | A | C | A | *Pseudomonas anguilliseptica* NCMB1950 | A | B | A |
| *Salmonella* serotype Enteritidis KX-S148 | A | C | A | *Lactobacillus plantarum* RIMD 1202001 | A | C | A |
| *Salmonella* serotype Anatum KX-S152 | A | C | A | *Clostridium perfringens* NCTC8237 | A | D | A |
| *Salmonella* serotype Krefeld KX-S124 | A | C | A | *Campylobacter jejuni* subsp. *Jejuni* JCM2013 | A | B | A |
| *Plesiomonas shigelloides* KX-P1945 | A | B | A | *Campylobacter coli* JCM 2529 | A | B | A |
| *Shigella dysenteriae* serotype 2 KX-H214 | A | C | A | *Candida albicans* NCPF 3179 | A | B | A |
| *Shigella flexneri* subtype 1b KX-H273 | A | C | A | | | | |

EtOH: abbreviation of ethanol
S.H: abbreviation of sodium hypochlorite
D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).

5. Comparison Test 2 of Sterilization Effects Against Various Food Poisoning Microbes Except for blending a yeast extract to a concentration of 4 weight % in each of the test microbe solutions used in "4. Comparison test 1 of sterilization effects against various food poisoning microbes," the sterilization effects of the product according to the present invention and the comparison products were compared by the same method as in "4. Comparison test 1 of sterilization effects against various food poisoning microbes." The results are shown in Table 8.

invention exhibited a high sterilization effect in comparison to the ethanol solution and the sodium hypochlorite solution.

6. Sterilization Tests Using the Product According to the Present Invention

The product according to the present invention prepared in "4. Comparison test 1 of sterilization effects against various food poisoning microbes" was subject to the following sterilization tests.

6-1. Cutting board sterilization test A cutting board was immersed for 1 hour in physiological saline containing approximately $1 \times 10^5$ cfu/ml of *Escherichia coli* O-157 (en-

TABLE 8

| Microbe species (scientific name) | Product according to the present invention | EtOH 30% | S.H 150 ppm | Microbe species (scientific name) | Product according to the present invention | EtOH 30% | S.H 150 ppm |
|---|---|---|---|---|---|---|---|
| *Vibrio parahaemolyticus* AQ3815 | A | C | C | *Shigella boydii* serotype 4 KX-H288 | B | D | D |
| *Vibrio cholerae* O1 NIH 41 | B | C | D | *Shigella sonnei* KX-H285 | C | C | D |
| *Vibrio cholerae* O139 MO45 | B | C | D | *Aeromonas sobria* KX-A435 | B | C | D |
| *Vibrio cholerae* non-O1 non-O139 KX-N105 | B | C | D | *Aeromonas hydrophila* KX-A428 | A | C | D |
| *Vibrio mimicus* KX-M5 | A | C | D | Enteropathogenic *Escherichia coli* O55 KX-E59 | C | D | D |
| *Vibrio fluvialis* KX-F24 | A | C | D | Enterotoxigenic *Escherichia coli* RIMD 0509267 | C | D | D |
| *Staphylococcus aureus* 080392-1 Toxin type A | C | D | D | Enterohemorrhagic *Escherichia coli* O157:H7 EDL 933 | B | D | D |
| *Salmonella* serotype Stanley KX-S141 | B | C | D | Enteroinvasive *Escherichia coli* O28ac KX-E63 | B | C | D |
| *Salmonella* serotype Agona KX-S143 | B | C | D | Enteroaggregative *Escherichia coli* O111:H21 K-H-6 | B | D | D |
| *Salmonella* serotype Rissen KX-S151 | B | C | D | *Bacillus cereus* Kyoto 1 | C | D | D |
| *Salmonella* serotype Kentucky KX-S149 | B | C | D | *Pseudomonas anguilliseptica* NCMB 1950 | A | B | D |
| *Salmonella* serotype Enteritidis KX-S148 | B | C | D | *Lactobacillus plantarum* RIMD 1202001 | B | D | D |
| *Salmonella* serotype Anatum KX-S152 | B | C | D | *Clostridium perfringens* NCTC8237 | B | D | D |
| *Salmonella* serotype Krefeld KX-S124 | B | C | D | *Campylobacter jejuni* subsp. *Jejuni* JCM2013 | A | B | C |
| *Plesiomonas shigelloides* KX-P1945 | B | B | C | *Campylobacter coli* JCM 2529 | A | B | C |
| *Shigella dysenteriae* serotype 2 KX-H214 | B | C | C | *Candida albicans* NCPF 3179 | A | C | D |
| *Shigella flexneri* subtype 1b KX-H273 | C | D | D | | | | |

EtOH: abbreviation of ethanol
S.H: abbreviation of sodium hypochlorite
D: There is no sterilization effect.
C: There is a sterilization effect in step (1) but no sterilization effect in step (2).
B: There is a sterilization effect up to step (2) but no sterilization effect in step (3).
A: There is a sterilization effect up to step (3).

As is clear from Table 7, against the test microbe solutions in which the yeast extract was not blended, the product according to the present invention exhibited a high sterilization effect in comparison to the ethanol solution and exhibited a high sterilization effect equivalent to the sodium hypochlorite solution. Further, the results of Table 8 show that against the test microbe solutions in which the yeast extract was blended (microbe solutions with which a sterilization effect is not expressed readily), the product according to the present terohemorrhagic *Escherichia coli* O157: H7 EDL 933), and after lightly draining off the solution from the cutting board, the product according to the present invention was sprayed on (0.7 ml), and 1 minute later, a sample was taken using a sterile cotton swab from a portion onto which the product according to the present invention was sprayed, inoculated onto a CHROMagar O-157 agar medium (Kanto Chemical), and cultured for 24 hours at 37° C., and then the viable bacteria count was measured.

As a comparison product, a sterilization treatment was performed by the same method as the above using 70 weight % ethanol, which is generally used for sterilization purposes in food factories, and the viable bacteria count was measured. The results are shown in Table 9.

As is clear from Table 9, it was confirmed that in comparison to an experimental section in which a sterilization treatment was not performed and the experimental section in which the sterilization treatment by 70 weight % ethanol was performed, the viable bacteria count was significantly reduced in the experimental section in which the treatment by the product according to the present invention was performed.

TABLE 9

Cutting board microbe eradication results (general viable bacteria count)

| | |
|---|---|
| Product according to the present invention | No more than 300 |
| 70% ethanol | $2.8 \times 10^4$ |
| Without sterilizer added | $6.8 \times 10^5$ |

6-2. Sterilization Test 2 Using the Product According to the Present Invention 1.4 ml of the product according to the present invention was sprayed on and spread across an entirety of a hand that was washed and then dried, and 1 minute later, a sample was taken using a sterile cotton swab from a portion onto which the product according to the present invention was sprayed, inoculated onto a standard agar medium (Nissui Pharmaceutical), and cultured for 48 hours at 37° C., and then the viable bacteria count was measured.

As a comparison product, a sterilization treatment was performed by the same method as the above using 70 weight % ethanol, which is generally used for sterilizing purposes in food factories, and the viable bacteria count was measured. The results are shown in Table 10.

As is clear from Table 10, it was confirmed that in comparison to the experimental section in which the sterilization treatment by 70 weight % ethanol was performed, the viable bacteria count was significantly reduced in the experimental section in which the treatment by the product according to the present invention was performed.

TABLE 10

Hand sterilization results (general viable bacteria count)

| | |
|---|---|
| Product according to the present invention | No more than 300 |
| 70% ethanol | $6.2 \times 10^3$ |

6-3. Sterilization Test 3 Using the Product According to the Present Invention

After adding and mixing 2 ml of a *Campylobacter* solution (*Campylobacter jejuni* subsp. *Jejuni* JCM2013) of $1 \times 10^4$ cfu/ml into 200 g of beef (yukhoe; raw beef), treatments were carried out according to experimental sections 1 to 4 described below, the treated beef (yukhoe) samples were then stored at 10° C., 20 g of beef were sampled immediately, 5 hours, and 24 hours after storage respectively, diluted with 180 ml of sterilized physiological saline (saline concentration: 0.85%), and smashed with a stomacher to prepare test solutions, 1 ml of each test solution was transferred to a sterilized Petri dish to which a BHI agar medium (Eiken Chemical) was then added, and after drying, microaerobic culturing at 42° C. was performed for 48 hours and then the viable bacteria count was measured. The results are shown in FIG. 1.

(Experimental Sections)

Experimental section 1: The product according to the present invention was sprayed and mixed.

Experimental section 2: After immersing for 1 minute in the product according to the present invention, the product was drained off.

Experimental section 3: 70 weight % ethanol was sprayed and mixed

Experimental section 4: Untreated

At the point of 24 hours after, whereas the experimental section 1 in which the sterilization treatment by the product according to the present invention was performed indicated a viable bacteria count of approximately $10^4$, the experimental section 3 in which the sterilization treatment by 70 weight % ethanol was performed indicated a viable bacteria count of approximately $10^5$ to $10^6$. It was thus confirmed that the product according to the present invention exhibited a better sterilizing activity than 70 weight % ethanol.

Also, when beef (yukhoe) samples were separately prepared according to the experimental sections 1 to 4 and a palatability test was performed on the beef (yukhoe) samples in unseasoned states, whereas the sample of the experimental section 1 had a palatability equivalent to that of the experiment section 4 in which the sterilization treatment was not performed, bitterness due to ethanol was tasted with the sample of the experimental section 3.

Further, in regard to the method of treating foods by the product according to the present invention, it was found that the immersion treatment (experimental section 2) excelled over the spraying treatment (experimental section 1) in terms of sustainability of the sterilizing activity.

7. Safety Tests Using the Product According to the Present Invention

The product according to the present invention prepared in "4. Comparison test 1 of sterilization effects against various food poisoning microbes" was subject to the following three types of safety tests.

7-1. Acute Oral Toxicity Test Using Mice

Acute oral toxicity in mice was examined using the product according to the present invention as the tested product.

5-week-old male and female ICR mice (Japan SLC, Inc.) were purchased and used in the test after rearing preliminarily for approximately 1 week to confirm that there were no abnormalities in general conditions. Five test animals were kept in each cage made of polycarbonate and were reared in a rearing room set at a room temperature of 23±2° C. and an illumination time of 12 hours/day. The animals were allowed to freely consume feed (solid feed for mice and rats: Labo MR Stock, Nosan Corporation) and drinking water (tap water).

The tested product was diluted with injection solvent to prepare a 100 mg/ml test solution. A test group to which the tested product was administered at an administration amount of 2000 mg/kg and a control group to which the injection solvent was administered as a solvent control were set up, and five each of male and female rats were used in each group.

The test animals were fasted for approximately 4 hours before administration. After measuring the body weights, the test solution was administered to the test group and the injection solvent was administered to the control group at an administration volume of 20 ml/kg respectively by forced single oral administration using a gastric tube. The observation period was set to 14 days. Observation was performed frequently on the day of administration and once a day from the next day onward. The body weights were measured 7 and 14 days after administration and comparison between groups was performed by a t-test at a significance level of 5%. The body weight measurement results are shown in Table 11

(males) and Table 12 (females). All animals were autopsied at the end of the observation period.

TABLE 11

Body weight change (males)

| Administration group | Before administration | After administration (days) | |
|---|---|---|---|
| | | 7 | 14 |
| Test group | 33.8 ± 0.6 (5) | 37.6 ± 1.5 (5) | 40.7 ± 1.2 (5) |
| Control group | 34.0 ± 0.5 (5) | 38.5 ± 0.8 (5) | 40.1 ± 1.5 (5) |

The body weights are expressed as: average value ± standard deviation (units: g).

The number of animals is indicated inside the parenthesis.

TABLE 12

Body weight change (females)

| Administration group | Before administration | After administration (days) | |
|---|---|---|---|
| | | 7 | 14 |
| Test group | 28.1 ± 1.4 (5) | 30.8 ± 1.2 (5) | 33.5 ± 1.1 (5) |
| Control group | 28.4 ± 1.3 (5) | 31.0 ± 1.7 (5) | 32.9 ± 2.2 (5) |

The body weights are expressed as: average value ± standard deviation (units: g).

The number of animals is indicated inside the parenthesis.

In regard to death cases in the test results, death cases were not seen during the observation period for both males and females in both test groups. In regard to general conditions, abnormalities were not seen during the observation period for both males and females in both test groups. In regard to body weight measurements 7 and 14 days after administration, differences in body weight values in comparison to the control group were not seen in both males and females in the test group. In the autopsies at the end of the observation period, abnormalities were not seen in any of the male and female test animals. From these results, it is considered that the LD50 value of the tested product in mice by single oral administration is no less than 2000 mg/kg for both males and females.

7-2. Eye Irritancy Test Using Rabbits

Eye irritancy in rabbits was examined using the product according to the present invention as the tested product in compliance to the OECD Guideline for the Testing of Chemicals (2002).

Male Japanese White rabbits (Kitayama Labes Co., Ltd.) were purchased and after rearing preliminarily for approximately 1 week to confirm that there were no abnormalities in general conditions, three of the rabbits were used in the test. Each test animal was kept individually in a cage made of FRP and reared in a rearing room set at a room temperature of 22±2° C. and an illumination time of 12 hours/day. As feed, the animals were fed restrictedly with solid feed for rabbis and guinea pigs (LRC4, Oriental Yeast Co., Ltd.) and allowed to freely consume tap water as drinking water. The rabbits with body weights before testing of 3.22 kg, 3.23 kg, and 3.06 kg were respectively indicated as rabbit No. 1, rabbit No. 2, and rabbit No. 3.

Anterior eye parts of both eyes of each test animal were inspected on the day of the start of the test to confirm that there were no abnormalities. After measuring the body weight, 0.1 ml of the tested product was instilled into the conjunctival sac of one eye of each test animal and the upper and lower eyelids were gently closed and held for approximately 1 second. The other eye was left untreated as a control. The cornea, iris, conjunctiva, etc., were observed using a slit lamp (×10) (Ohira Co., Ltd.) 1, 24, 48, and 72 hours after the ocular instillation and the degree of eye irritancy was scored according to the standards of the Draize method. Using the score values obtained, a total evaluation score was calculated for each test animal and an average total evaluation score for the three animals was determined for each observation time.

At each observation time with the exception of 1 hour after the ocular instillation, the presence/non-presence and degree of corneal epithelium damage were observed in detail using sodium fluorescein.

The results are shown in Table 13 (rabbit No. 1), Table 14 (rabbit No. 2), and Table 15 (rabbit No. 3).

TABLE 13

Scoring results for rabbit No. 1

| Observed location | | Scoring results (observation time (h) and evaluation score) | | | |
|---|---|---|---|---|---|
| | | 1 h | 24 h | 48 h | 72 h |
| (1) Cornea | Degree of clouding (A) | 0* (0) | 0* (0) | 0 (0) | 0 (0) |
| | Area of clouded portion (B) | — (—) | — (—) | — (—) | — (—) |
| (2) Iris (A) | | 0 (0) | 0 (0) | 0 (0) | 0 (0) |
| (3) Conjunctiva | Reddening (A) | 1 (0) | 1 (0) | 0 (0) | 0 (0) |
| | Edema (B) | 0 (0) | 0 (0) | 0 (0) | 0 (0) |
| | Secretion (C) | 1 (0) | 2 (0) | 0 (0) | 0 (0) |
| Score (1) = A × B × 5 | | 0 (0) | 0 (0) | 0 (0) | 0 (0) |
| Score (2) = A × 5 | | 0 (0) | 0 (0) | 0 (0) | 0 (0) |
| Score (3) = (A + B + C) × 2 | | 4 (0) | 6 (0) | 0 (0) | 0 (0) |
| Total evaluation score [(1) + (2) + (3)] | | 4 (0) | 6 (0) | 0 (0) | 0 (0) |

The results for the control eye are shown in parenthesis.
—: Not determined.
*Roughening of the corneal surface was seen.

TABLE 14

Scoring results for rabbit No. 2

| Observed location | | Scoring results (observation time (h) and evaluation score) | | | |
|---|---|---|---|---|---|
| | | 1 h | 24 h | 48 h | 72 h |
| (1) Cornea | Degree of clouding (A) | 0* (0) | 0 (0) | 0 (0) | 0 (0) |
| | Area of clouded portion (B) | — (—) | — (—) | — (—) | — (—) |
| (2) Iris (A) | | 0 (0) | 0 (0) | 0 (0) | 0 (0) |
| (3) Conjunctiva | Reddening (A) | 1 (0) | 1 (0) | 0 (0) | 0 (0) |
| | Edema (B) | 0 (0) | 0 (0) | 0 (0) | 0 (0) |
| | Secretion (C) | 1 (0) | 0 (0) | 0 (0) | 0 (0) |
| Score (1) = A × B × 5 | | 0 (0) | 0 (0) | 0 (0) | 0 (0) |
| Score (2) = A × 5 | | 0 (0) | 0 (0) | 0 (0) | 0 (0) |
| Score (3) = (A + B + C) × 2 | | 4 (0) | 2 (0) | 0 (0) | 0 (0) |
| Total evaluation score [(1) + (2) + (3)] | | 4 (0) | 2 (0) | 0 (0) | 0 (0) |

The results for the control eye are shown in parenthesis.
—: Not determined.
*Roughening of the corneal surface was seen.

TABLE 15

Scoring results for rabbit No. 3

| Observed location | | Scoring results (observation time (h) and evaluation score) | | | |
|---|---|---|---|---|---|
| | | 1 h | 24 h | 48 h | 72 h |
| (1) Cornea | Degree of clouding (A) | 0* (0) | 0 (0) | 0 (0) | 0 (0) |
| | Area of clouded portion (B) | — (—) | — (—) | — (—) | — (—) |
| (2) Iris (A) | | 0 (0) | 0 (0) | 0 (0) | 0 (0) |
| (3) Conjunctiva | Reddening (A) | 1 (0) | 1 (0) | 0 (0) | 0 (0) |
| | Edema (B) | 0 (0) | 0 (0) | 0 (0) | 0 (0) |
| | Secretion (C) | 1 (0) | 0 (0) | 0 (0) | 0 (0) |
| Score (1) = A × B × 5 | | 0 (0) | 0 (0) | 0 (0) | 0 (0) |
| Score (2) = A × 5 | | 0 (0) | 0 (0) | 0 (0) | 0 (0) |
| Score (3) = (A + B + C) × 2 | | 4 (0) | 2 (0) | 0 (0) | 0 (0) |
| Total evaluation score [(1) + (2) + (3)] | | 4 (0) | 2 (0) | 0 (0) | 0 (0) |

The results for the control eye are shown in parenthesis.
—: Not determined.
*Roughening of the corneal surface was seen.

As a result of instilling 0.1 ml of the tested product into one eye of each of the three rabbits, reddening of the eyelid and bulbar conjunctiva (score: 1), a milky, liquid secretion (score: 1 to 2), and roughening of the corneal surface were seen in the test eyes of all examples from 1 hour after the ocular instillation. For two examples (rabbits No. 2 and No. 3), the secretion and roughening of the corneal surface disappeared at 24 hours and the remaining irritation reaction disappeared at 48 hours. Besides the above, there was an example in which hyperemia of the nictitating membrane was seen.

For the control eyes, irritation reactions were not seen throughout the observation period in all examples. Also, in inspection by sodium fluorescein, staining was not observed in any of the observation times for both the test eyes and control eyes.

The maximum values of the average total evaluation score during the observation period were 4.0 for the test eyes (1 hour after ocular installation) and 0 for the control eyes. From these results, the test product was evaluated to be in the category of "nonirritating substances" in the eye irritancy test using rabbits.

7-3. Primary Skin Irritation Test in Rabbits

Primary skin irritation in rabbits was examined using the product according to the present invention as the tested product in compliance to the OECD Guideline for the Testing of Chemicals (2002).

Male Japanese White rabbits (Kitayama Labs Co., Ltd.) were purchased and after rearing preliminarily for approximately 1 week to confirm that there were no abnormalities in general conditions, three rabbits were used in the test. Each test animal was kept individually in a cage made of FRP and reared in a rearing room set at a room temperature of 22±2° C. and an illumination time of 12 hours/day. As feed, the animals were fed restrictedly with solid feed for rabbits and guinea pigs (LRC4, Oriental Yeast Co., Ltd.) and allowed to freely consume tap water as drinking water. The rabbits with body weights before testing of 3.48 kg, 3.17 kg, and 3.09 kg were respectively indicated as rabbit No. 1, rabbit No. 2, and rabbit No. 3.

The fur of a dorsal portion of the trunk of each test animal was shaved approximately 24 hours before the test. After measuring the body weight, four locations with an area of 6 cm² were set in each test animal, a scar was made in the keratinized layer so as not to reach the dermis at two of the four locations (scarred skin) and the other two locations were left untreated (unscarred skin). 0.5 ml of the tested product was coated uniformly onto a gauze patch cut to approximately 2 cm×3 cm, and after applying to one of each of the unscarred and scarred skin locations, the patch was fixed by MultiFix roll (ALCARE Co., Ltd.). Further, Blenderm surgical tape (3M Health Care Co., Ltd.) was used to hold the patch so that the patch contacted the skin. The remaining unscarred and scarred skin locations were used as controls.

The application time was set to 4 hours, and thereafter, the patches were removed and the application locations were wiped clean with injection solvent. Observations were made 1, 24, 48, and 72 hours after removal and irritation reaction scoring was performed according to the following standards.

<Formation of Erythema and Crust>

| | |
|---|---|
| No erythema | 0 |
| Extremely light erythema (can barely be identified) | 1 |
| Clear erythema | 2 |
| Intermediate to advanced erythema | 3 |
| Advanced erythema to slight crust formation (to deep damage) | 4* |

(Maximum score: 4)
*Bleeding, ulceration, and necrosis were regarded as deep damage and classified as a score of 4.

<Formation of Edema>

| | |
|---|---|
| No edema | 0 |
| Extremely light edema (can barely be identified) | 1 |
| Light edema (a clear edge due to clear bulging can be identified) | 2 |
| Intermediate edema (bulging of approximately 1 mm) | 3 |
| Advanced edema (bulging of no less than 1 mm and spreading beyond exposed range) | 4* |

(Maximum score: 4)

In compliance to the Federal Register (1972), the score values at 1, 24, and 48 hours after patch removal were summed and then divided by 6, the average for each test animal was further calculated as a primary irritation index (P.I.I.), and the irritating property of the tested product was evaluated based on the standards of ISO 10993-10 shown below. The results are shown in Table 16.

<Primary irritation reaction categories for rabbits>

| (Reaction category) | (P.I.I.) |
|---|---|
| Nonirritating | 0 to 0.4 |
| Weakly irritating | 0.5 to 1.9 |
| Intermediately irritating | 2 to 4.9 |
| Strongly irritating | 5 to 8 |

TABLE 16

Results of skin reaction scoring

| Observation time (hours) | Rabbit No. 1 | | Rabbit No. 2 | | Rabbit No. 3 | |
|---|---|---|---|---|---|---|
| | Unscarred | Scarred | Unscarred | Scarred | Unscarred | Scarred |
| 1 | 2/0 | 2/0 | 2/0 | 2/0 | 2/0 | 2/0 |
| 24 | 0/0 | 0/0 | 0/0 | 0/0 | 1/0 | 0/0 |
| 48 | 0/0 | 0/0 | 0/0 | 0/0 | 0/0 | 0/0 |
| 72 | 0/0 | 0/0 | 0/0 | 0/0 | 0/0 | 0/0 |

The results are indicated in the order of: erythema and crust/edema.

Although clear erythema (score: 2) was seen in all application locations 1 hour after removal, the erythema disappeared from the unscarred skins of two examples (rabbit No. 1 and rabbit No. 2) and the scarred skins of all examples at 24 hours and disappeared from the remaining application locations at 48 hours, and irritation reactions were not seen afterward. The primary irritation index (P.I.I.) determined in compliance to the Federal Register (1972) was 0.7, and thus in the primary skin irritation test using rabbits, the tested product was evaluated to be in the category of "weakly irritating substances."

The sterilizer according to the present invention is widely usable as a sterilizer applicable not only to foods themselves but also to cooking utensils, cooking equipments, and other food manufacturing equipments.

What is claimed is:

1. An aqueous solution or dispersion food sterilizer comprising:
   0.1wt. % to 0.2 wt. % calcinated calcium;
   5 wt. % to 10 wt. % ethanol; and
   1.5 wt. % to 9 wt. % sodium lactate;
   whereby said food sterilizer has sterilization effects against enterohemorrhagic *Eschericia coli* and *Staphylococcus aureus*.

2. The sterilizer for foods according to claim 1 wherein the calcinated calcium is one type of substance or a mixture of two or more types of substances selected from among calcinated products of oyster shells, scallop shells, surf clam shells, eggshells, and coral shells.

3. The sterilizer for foods according to claim 1 wherein an average particle diameter of the calcinated calcium is 0.1 to 10 µm.

4. A preserved food mixed with the sterilizer for foods according to claim 1.

5. The sterilizer for foods according to claim 2, wherein an average particle diameter of the calcinated calcium is 0.1 to 10 µm.

6. A preserved food mixed with the sterilizer for foods according to claim 2.

7. A preserved food mixed with the sterilizer for foods according to claim 3.

8. The sterilizer for foods according to claim 1 further prepared by adding a fragrance or a dye.

9. A preserved food obtained by sterilization by the sterilizer for foods according to claim 8.

10. The sterilizer for foods according to claim 1 wherein said enterohemorrhagic *Eschericia coli* is *Eschericia coli* O157.

* * * * *